US005669446A

United States Patent [19]
Walker et al.

[11] Patent Number: 5,669,446
[45] Date of Patent: Sep. 23, 1997

[54] METHODS FOR BREAKING VISCOSIFIED FLUIDS

[75] Inventors: Michael L. Walker, Duncan; Chris E. Shuchart, Norman; John M. Terracina, Duncan; Billy F. Slabaugh, Marlow; Michael A. McCabe, Duncan, all of Okla.

[73] Assignee: Halliburton Energy Services, Inc., Duncan, Okla.

[21] Appl. No.: 625,957

[22] Filed: Apr. 1, 1996

[51] Int. Cl.[6] ............................................. E21B 43/26
[52] U.S. Cl. ...................... 166/300; 166/305.1; 166/308; 507/215; 507/216; 507/217; 507/258; 507/903; 507/921; 507/922
[58] Field of Search .............................. 166/278, 300, 166/305.1, 308; 252/315.3, 315.4; 507/211, 214, 215, 216, 217, 256, 258, 903, 921, 922

[56] References Cited

U.S. PATENT DOCUMENTS

| | | | |
|---|---|---|---|
| 4,941,537 | 7/1990 | Langemeier et al. | 166/300 |
| 5,067,565 | 11/1991 | Holtmyer et al. | 166/305.1 |
| 5,110,486 | 5/1992 | Manalastas et al. | 166/308 X |
| 5,143,157 | 9/1992 | Harms | 166/300 |
| 5,253,711 | 10/1993 | Mondshine | 166/300 |
| 5,393,439 | 2/1995 | Laramay et al. | 507/211 |
| 5,413,178 | 5/1995 | Walker et al. | 166/300 |
| 5,460,226 | 10/1995 | Lawson et al. | 166/300 |
| 5,497,830 | 3/1996 | Boles et al. | 166/300 |

*Primary Examiner*—George A. Suchfield
*Attorney, Agent, or Firm*—Robert A. Kent

[57] ABSTRACT

The present invention relates to a method of breaking an aqueous based viscosified fluid having potassium ions present therein with a breaker comprising an alkali metal chlorite or hypochlorite through use of a breaker activator comprising a source of ammonium ion in the aqueous fluid. The method is particularly effective in providing a controlled break in a treatment fluid introduced into a subterranean formation having a static temperature in the range of from about 100° F. to about 300° F. In some instances, a second breaker activator comprising a source of thioglycolate ion also may be admixed with the viscosified fluid to further accelerate breaker activation at temperatures below about 200° F.

20 Claims, No Drawings

METHODS FOR BREAKING VISCOSIFIED FLUIDS

BACKGROUND OF THE INVENTION

1. Field of the Invention

The present invention relates to compositions and methods for treating subterranean formations. Specifically, the invention is directed to compositions used to break fracturing fluids utilized in the stimulation of subterranean formations wherein the fluid contains potassium ions in an amount of at least 0.05 molar concentration.

2. Description of the Prior Art

It is common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a viscosifying agent and/or an emulsifier is used to gel or emulsify the fracturing fluid to provide the high viscosity needed to realize the maximum benefits from the fracturing process.

After the high viscosity fracturing fluid has been pumped into the formation and fracturing of the formation occurred, it is desirable to remove the fluid from the formation to allow hydrocarbon production through the new fractures. Generally, the removal of the highly viscous fracturing fluid is realized by "breaking" the gel or in other words, by converting the fracturing fluid into a low viscosity fluid. Breaking the gelled or emulsified fracturing fluid has commonly been accomplished by adding a "breaker," that is, a viscosity-reducing agent, to the fracturing fluid prior to pumping into the subterranean formation. However, this technique can be unreliable and sometimes results in incomplete breaking of the fluid, particularly when gel stabilizers are present and/or premature breaking of the fluid before the fracturing process is complete.

U.S. Pat. No. 5,413,178 discloses a means for breaking an aqueous based fracturing fluid or treatment fluid at a temperature above 175° F. through use of an effective amount of an alkali metal chlorite or hypochlorite. The breaker is particularly effective in the temperature range of 225° F. to about 300° F.

It has been determined that alkali metal chlorites generally are ineffective as a breaker within a reasonable time period at temperatures below 175°–200° F. Surprisingly, it has also been determined that the presence of potassium ions in a fluid can function to stabilize the fluid against breaking in the presence of alkali metal chlorites over a broad temperature range.

It would be desirable to provide a means by which alkali metal chlorites or hypochlorites could be utilized to provide a controlled break at temperatures in the range of from about 100° F. to about 300° F. in fluids in which potassium ions are present.

SUMMARY OF THE INVENTION

The present invention relates to a method of controllably breaking an aqueous based fracturing fluid or treatment fluid containing potassium ions in an amount of at least about 0.05 molar which has been viscosified with polysaccharides at temperatures in the range of from about 100° to about 300° F. The method is accomplished by the incorporation of an effective amount of an ammonium and additionally, in some instances, a thioglycolate ion comprising thioglycolic acid or its salts which are capable of producing thioglycolate ion in solution in combination with an effective amount of an alkali metal chlorite or hypochlorite whereby the breaker is activated to provide a controlled break.

DESCRIPTION OF THE PREFERRED EMBODIMENT

The viscosifying or gelling agent employed in the present invention includes natural and derivatized polysaccharides which are soluble, dispersible, or swellable in an aqueous liquid to yield viscosity to the fluid. One group, for example, of polysaccharides which are suitable for use in the present invention include gum arabic, gum ghatti, gum karaya, tamarind gum, tragacanth gum, guar gum, locust bean gum and the like. Modified gums such as carboxyalkyl derivatives, like carboxymethyl guar, and hydroxyalkyl derivatives, like hydroxypropyl guar also can be employed. Doubly derivatized gums such as carboxymethylhydroxypropyl guar (CMHPG) can also be used. Modified celluloses and derivatives thereof also can be employed. There are thus literally thousands of such materials which have varying properties that can be employed in the practice of the present invention, for example, cellulose ethers, esters and the like.

In general, any of the water-soluble cellulose ethers can be used in the practice of the invention. Those cellulose ethers which can be used include, among others, the various carboxyalkyl cellulose ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565. The entire disclosure of which is incorporated herein by reference. Most preferred polysaccharides are the galactomanans, modified or derivative galactomanans, and cellulose derivatives, examples of which are given above.

The chemistry and materials involved in the preparation of polysaccharide gelled fluids of the type described above is well understood in the art. As is well understood, the amount of gelling or viscosifying agent employed in the aqueous gel depends upon the desired viscosity of the solution. The gelling agent generally is present in an amount of from about 10 to about 120 pounds per 1000 gallons of fluid. The preferred concentration is in the range of from about 20 to about 60 pounds per 1000 gallons of fluid.

The fluid may include a crosslinking agent to further enhance the development of viscosity by crosslinking the gelling agent in the fluid. The crosslinking agent can comprise a borate releasing compound or any of the well known transition metal ions which are capable of creating a crosslinked structure with the particular gelling agent utilized. Examples of such crosslinking agents sources include a borate releasing compound such as sodium tetraborate, aluminum, zirconium or titanium chelates, antimony compounds and the like. The crosslinking agent can be controlled to permit introduction of the fluid into a wellbore before the viscosity significantly increases.

The aqueous fluid utilized in the preparation of the gelled fluid often includes a salt such as potassium chloride to minimize the chances of damage to the subterranean formation upon contact with the fluid. The present invention is particularly directed to those fluids in which potassium ions are present and more particularly to those in which the potassium ion concentration is at least about 0.05 molar and most particularly is in the range of from about 0.1 to about 1.2 molar.

The fluid also may include any of the other conventional additives such as proppants, pH control agents, bactericides, clay stabilizers, surfactants and the like which do not adversely react with the other constituents to inhibit performance of the desired treatment upon a subterranean formation.

The breaker system for the gelled fluid comprises an effective amount of at least one compound selected from the group consisting of calcium hypochlorite and alkali metal chlorites or hypochlorites in at least partially water soluble form and an effective amount of a breaker activator comprising a source of ammonium ions and at low temperatures a source of ammonium ions and a thioglycolate salt or acid compound capable of producing thioglycolate ion in an aqueous fluid.

The amount of breaker employed is that amount required to reduce the viscosity of the stabilized gelled fluid at a temperature above about 100° F. to a preselected lower viscosity or to a complete break as most desired within a desired period of time. The optimum or effective amount of breaker employed in the present invention depends on factors such as the injection period desired, the particular gelling agent and its concentration, the particular breaker and the formation temperature as well as other factors. Typically, however, from about 0.1 to about 30 pounds of the chlorite breaker is employed per 1000 gallons of fluid. Most preferably, to achieve a desired break in from about 6 to 24 hours in the fluid, from about 1 to about 10 pounds of chlorite is employed per 1000 gallons of fluid.

The amount of breaker activator employed is that amount required to activate the chlorite breaker in the temperature range of from about 100° F. to about 300° F. to yield a lower viscosity within a desired period of time. The optimum or effective amount of activator depends on factors such as the injection period desired, the particular gelling agent and its concentration, the particular breaker and the formation temperature as well as other factors.

EXAMPLE I

The ammonium ion breaker activator in the form of ammonium chloride typically will be present in an amount of from about 0.05 to about 40 pounds per 1000 gallons of fluid. Most preferably, to achieve desired breaks in less than about 24 hours in the fluid, from about 0.5 to about 10 pounds of ammonium ion is employed.

Compounds capable of producing ammonium ion in solution include ammonium chloride, ammonium hydroxide, ammonium sulfate, ammonium bromide and the like.

When it is desired to rapidly break gelled fluids at a temperature in the range of from about 100° F. to about 200° F. a second activator comprising a source of thioglycolate ion is added to the gel along with the first activator. The optimum or effective amount of the second activator depends upon factors such as the injection period desired, the particular gelling agent, breaker and formation temperatures as described above with respect to the first activator. The source of thioglycolate ion will function to further accelerate the rate of breaking of the gelled fluid.

Typically, from about 0.05 to about 40 pounds of thioglycolate ion is employed per 1000 gallons of fluid. Most preferably, to achieve desired breaks at temperatures in the range of 100° F. to 200° F. in from about 6 to 24 hours in the fluid from about 0.2 to about 20 pounds of thioglycolate ion is employed. Compounds capable of producing thioglycolate ions in solution include methyl thioglycolate, calcium, potassium, sodium salts of thioglycolate and the like. When such compounds are utilized, a sufficient quantity is used to provide the equivalent designated quantity of thioglycolate ion. Ammonium thioglycolate may also be used as it provides both a source of ammonium ion and thioglycolate ion. However, the amounts of these ions are in a fixed ratio and it may be necessary to add additional ammonium or thioglycolate ions to achieve the desired concentrations.

To further illustrate the present invention, but not by way of limitation, the following examples are provided.

Static break tests were performed to evaluate break capability in fluid systems with the breaker activator. The gel was prepared by adding to a 2% KCl solution, 30 pounds guar/1000 gallons of fluid, 0.1 gallon sodium acetate/acetic acid buffer/1000 gallons of fluid, 0.5 gallon/1000 gallons of a 25% caustic solution and 0.9 gallon of a borate crosslinker/1000 gallons of fluid. The gelling agent was permitted to hydrate for approximately 20 minutes prior to addition of the crosslinker. The breaker comprised sodium chlorite in the quantities identified in the Table and the activator comprised the designated quantities of ammonium ion and thioglycolic acid neutralized with sodium hydroxide in the quantities indicated in the Table. The break test was performed at a temperature of 125° F. The initial fluid pH was 11.01 and initial viscosity was 21 cps. before addition of the borate crosslinker.

TABLE I

| Sample No. | Breaker lbs/1000 gallons | Ammonium Chloride Activator lbs/1000 gallons | Thioglycolic Acid Activator lbs/1000 gallons | Viscosity With Time, cps | | | | | |
|---|---|---|---|---|---|---|---|---|---|
| | | | | 0.5 Hr | 1 Hr | 2 Hr | 4 Hr | 6 Hr | 24 Hr |
| 1 | 5 | 5 | 1/2 | WC[1] | WC | WC | 22 | 15 | 3 |
| 2 | 10 | 5 | 1/2 | WC | WC | WC | WC | 70 | 6 |
| 3 | 5 | 5 | 1 | WC | WC | WC | 40 | 25 | 3.5 |
| 4 | 10 | 5 | 1 | WC | WC | WC | 41 | 17 | 4 |
| 5 | 5 | 10 | 1 | 18.5 | 14 | 9 | 7 | 6 | 3 |
| 6 | 10 | 10 | 1 | 18 | 16 | 12 | 10 | 8 | 4.5 |
| 7 | 5 | 10 | 1/2 | 28 | 16 | 11 | 9 | 7.5 | 4 |
| 8 | 10 | 10 | 1/2 | 24 | 18 | 14 | 12 | 11 | 5 |
| 9 | 10 | 0 | 1 | C[2] | C | C | C | C | — |

1. WC: Weak Crosslink
2. C: Crosslinked

EXAMPLE II

The tests of Example I are repeated using 40 pounds guar/1000 gallons of fluid, 1 gallon 25% caustic solution and 1.2 gallons crosslinker/1000 gallons of fluid. The break test is performed at 150° F.

The results are set forth in Table II below.

TABLE II

| Sample No. | Breaker lbs/1000 gallons | Ammonium Chloride Activator lbs/1000 gallons | Thioglycolic Acid lbs/1000 gallons | Viscosity With Time, cps. | | | | | |
|---|---|---|---|---|---|---|---|---|---|
| | | | | 0.5 Hr | 1 Hr | 2 Hr | 4 Hr | 6 Hr | 24 Hr |
| 1 | 5 | 5 | 1/2 | C[1] | C | WC | 4.5 | — | — |
| 2 | 10 | 5 | 1/2 | C | C | C | WC | 30.5 | 4 |
| 3 | 5 | 5 | 1 | C | C | 16 | 4.5 | — | — |
| 4 | 10 | 5 | 1 | C | C | 34 | 6 | 4 | — |
| 5 | 5 | 10 | 1 | C | WC[2] | 8 | 4.5 | — | — |
| 6 | 10 | 10 | 1 | C | WC | 13 | 7 | 5 | — |
| 7 | 5 | 5 | 0 | C | C | C | C | C | C |
| 8 | 10 | 5 | 0 | C | C | C | C | C | C |
| 9 | 10 | 0 | 1/2 | — | C | C | — | — | C |
| 10 | 10 | 0 | 1/2 | — | C | C | — | — | WC |
| 11 | 5 | 0 | 1 | — | C | C | — | — | C |
| 12 | 5 | 0 | 1 | — | C | C | — | — | C |

1. C: Crosslinked
2. WC: Weak Crosslink

EXAMPLE III

The tests of Example II are repeated for a break test temperature of 175° F. The results of the tests are set forth in Table III, below.

TABLE III

| Sample No. | Breaker lbs/1000 gallons | Ammonium Chloride Activator lbs/1000 gallons | Thioglycolic Acid lbs/1000 gallons | Viscosity With Time, cps. | | | | | |
|---|---|---|---|---|---|---|---|---|---|
| | | | | 0.5 Hr | 1 Hr | 2 Hr | 4 Hr | 6 Hr | 24 Hr |
| 1 | 0 | 0 | 0 | C[1] | C | C | C | C | C |
| 2 | 0 | 0 | 2 | C | C | C | C | C | C |

TABLE III-continued

| Sample No. | Breaker lbs/1000 gallons | Ammonium Chloride Activator lbs/1000 gallons | Thioglycolic Acid lbs/1000 gallons | Viscosity With Time, cps. | | | | | |
|---|---|---|---|---|---|---|---|---|---|
| | | | | 0.5 Hr | 1 Hr | 2 Hr | 4 Hr | 6 Hr | 24 Hr |
| 3 | 5 | 0 | 0 | C | C | C | C | C | C |
| 4 | 10 | 0 | 0 | C | C | C | C | C | C |
| 5 | 5 | 5 | 1/2 | C | WC | 17 | 5.5 | 3.5 | — |
| 6 | 10 | 5 | 1/2 | C | C | 52 | 6.5 | 4.5 | — |
| 7 | 5 | 5 | 1 | C | WC | 8 | 4.0 | — | — |
| 8 | 10 | 5 | 1 | C | WC | 8 | 4 | — | — |
| 9 | 5 | 10 | 1 | WC² | 10 | 4.5 | — | — | — |
| 10 | 10 | 10 | 1 | WC | 13.5 | 5.5 | 3 | — | — |

1. C: Crosslinked
2. WC: Weak Crosslink

EXAMPLE IV

Break tests were performed to evaluate break capacity in a fluid-system with the ammonium ion breaker activator. The gel was prepared by adding 30 pounds of guar/1000 gallons of fluid, 0.2 gallon sodium acetate/acetic acid buffer, 5 pounds gel stabilizer, 0.5 pounds sodium chlorite/1000 gallons of fluid and 0.9 gallon borate crosslinker/1000 gallons of fluid. The break tests were performed at 240° F. using a "FANN Model 50" viscometer. The initial fluid pH was 11.5. The results of the test are set forth in Table IV, below.

TABLE IV

| Sample No. | Ammonium Chloride Activator lbs/1000 gallons | Viscosity With Time cPs | | | | |
|---|---|---|---|---|---|---|
| | | 23 Min | 30 Min | 60 Min | 90 Min | 120 Min |
| 1 | 0 | 100 | 74 | 86 | 85 | 74 |
| 2 | 0.4 | 100 | 90 | 77 | 55 | 22 |
| 3 | 16.7 | 100 | 75 | 41 | 5 | — |

The foregoing examples clearly illustrate the effect of the breaker activator and second breaker activator upon the alkali metal chlorite breaker in the presence of potassium ions. The data of Example IV illustrates how ammonium ions activate the breaker at elevated temperatures and the data of Examples I–III illustrate how added quantities of thioglycolate ion to the ammonium ion present effectively activate the breaker at temperatures below 200° F.

While that which is considered to comprise the preferred embodiments of the present invention has been described herein, it is to be understood that various other modifications will be apparent to and can be readily made by those skilled in the art without departing from the spirit or scope of the present invention as set forth in the appended claims.

What is claimed is:

1. A method of treating a zone of a subterranean formation penetrated by a wellbore wherein the static temperature of the zone of the formation is above about 100° F. comprising:
   injecting into the wellbore and into contact with said formation an aqueous fluid comprising (i) an aqueous liquid containing potassium ions, (ii) a viscosity increasing amount of a gelling agent comprising at least one member selected from the group of galactomanans, modified or derivatized galactomanans and cellulose derivatives, (iii) a crosslinker for said gelling agent, (iv) a breaker comprising at least one member selected from the group of alkali metal chlorites and hypochlorites present in an amount sufficient to effect a controlled reduction in the viscosity of said fluid and (v) a breaker activator comprising ammonium ion or a compound capable of producing ammonium ion in said aqueous liquid upon dissolution present in an amount sufficient to activate said breaker.

2. The method of claim 1 wherein said breakers is present in an amount of from about 0.1 to 30 pounds per 1000 gallons of fluid.

3. The method of claim 1 wherein said breaker activator is present in an amount of from about 0.05 to about 40 pounds per 1000 gallons of fluid.

4. The method of claim 1 wherein said formation has a temperature of from about 100° F. to about 300° F.

5. The method of claim 1 wherein said crosslinker comprises at least one member selected from the group of borate-releasing compounds, a source of titanium ions, a source of zirconium ions, a source of antimony ions and a source of aluminum ions.

6. The method of claim 1 wherein said gelling agent comprises at least one member selected from the group of guar, hydroxypropyl guar, carboxymethylhydroxypropylguar, carboxymethylhydroxyethyl cellulose, carboxymethyl cellulose and hydroxyethylcellulose grafted with vinyl phosphonic acid.

7. The method of claim 1 wherein said aqueous fluid also includes a second breaker activator comprising a source of thioglycolate ion present in an amount sufficient to accelerate activation of said breaker.

8. A method of fracturing a subterranean formation penetrated by a wellbore wherein the static temperature of the formation adjacent said wellbore is above about 100° F., comprising injecting into the wellbore and into contact with the formation at a rate and pressure sufficient to fracture the formation an aqueous fluid comprising:
   a) an aqueous liquid containing a source of potassium ions present in a concentration of at least about 0.05 molar;
   b) a gelling agent comprising at least one member selected from the group of galactomanans, modified or derivatized galactomanans, and cellulose derivatives present in an amount sufficient to increase the viscosity of said aqueous liquid;
   c) a crosslinking agent for said gelling agent present in an amount sufficient to effect crosslinking of said gelling agent in said aqueous liquid to further increase the viscosity of said aqueous liquid.

d) a breaker comprising at least one member selected from the group of alkali metal chlorites and hypochlorites present in an amount sufficient to effect a controlled reduction in the viscosity of the crosslinked gelling agent of the aqueous liquid after a predetermined period of time; and e) a breaker activator comprising ammonium ion or a compound capable of producing ammonium ion upon dissolution in said aqueous liquid present in an amount sufficient to activate said breaker to provide said controlled reduction in viscosity.

9. The method of claim 8 wherein said breaker is present in an amount of from about 0.1 to 30 pounds per 1000 gallons of fluid.

10. The method of claim 8 wherein said breaker activator is present in an amount of from about 0.05 to about 40 pounds per 1000 gallons of fluid.

11. The method of claim 8 wherein said formation has a temperature of from about 100° F. to about 200° F.

12. The method of claim 8 wherein said crosslinker comprises at least one member selected from the group of borate-releasing compounds, a source of titanium ions, a source of zirconium ions, a source of antimony ions and a source of aluminum ions.

13. The method of claim 8 wherein said gelling agent comprises at least one member selected from the group of guar, hydroxypropyl guar, carboxymethylhydroxypropylguar, carboxymethylhydroxyethyl cellulose, carboxymethyl cellulose and hydroxyethylcellulose grafted with vinyl phosphonic acid.

14. The method of claim 8 wherein said aqueous fluid also includes a second breaker activator comprising a source of thioglycolate ion present in an amount sufficient to accelerate activation of said breaker.

15. A method of breaking a treatment fluid containing a source of potassium ions for use in a subterranean formation wherein a gelling agent comprising at least one member selected from the group of galactomanans, modified or derivatized galactomanans and cellulose derivatives is used to viscosify the fluid and a breaker comprising at least one member selected from the group of alkali metal chlorites and hypochlorites is admixed with said fluid comprising admixing with said fluid a quantity of a breaker activator comprising a source of ammonium ion in said treatment fluid in an amount sufficient to activate said breaker to provide a controlled reduction in the viscosity of said treatment fluid.

16. The method of claim 15 wherein said breaker activator is present in an amount of from about 0.05 to about 40 pounds per 1000 gallons of treatment fluid.

17. The method of claim 15 wherein said treatment fluid includes a crosslinker for said gelling agent.

18. The method of claim 17 wherein said crosslinker comprises at least one member selected from the group of borate-releasing compounds, a source of titanium ions, a source of zirconium ions, a source of antimony ions and a source of aluminum ions.

19. The method of claim 15 wherein said gelling agent comprises at least one member selected from the group of guar, hydroxypropyl guar, carboxymethylhydroxypropylguar, carboxymethylhydroxyethyl cellulose, carboxymethyl cellulose and hydroxyethylcellulose grafted with vinyl phosphonic acid.

20. The method of claim 15 wherein said treatment fluid also includes activator comprising a source of thioglycolate ion which is admixed with said treatment fluid in an amount sufficient to accelerate activation of said breaker.

* * * * *